US010554725B2

(12) United States Patent
Kumar

(10) Patent No.: US 10,554,725 B2
(45) Date of Patent: Feb. 4, 2020

(54) SYSTEM, METHOD AND APPARATUS FOR PROVIDING ACCESS TO SERVICES

(71) Applicant: Samsung Electronics Co., Ltd., Suwon-si, Gyeonggi-do (KR)

(72) Inventor: Prashant Kumar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 15/193,578

(22) Filed: Jun. 27, 2016

(65) Prior Publication Data

US 2017/0005945 A1    Jan. 5, 2017

(30) Foreign Application Priority Data

Jul. 1, 2015  (IN) .......................... 1984/DEL/2015

(51) Int. Cl.
| | |
|---|---|
| *G06F 15/173* | (2006.01) |
| *H04L 29/08* | (2006.01) |
| *H04N 21/41* | (2011.01) |
| *H04N 21/2543* | (2011.01) |
| *H04N 21/472* | (2011.01) |
| *H04N 21/478* | (2011.01) |
| *H04N 21/436* | (2011.01) |
| *H04W 4/80* | (2018.01) |

(52) U.S. Cl.
CPC ....... *H04L 67/025* (2013.01); *H04N 21/2543* (2013.01); *H04N 21/4126* (2013.01); *H04N 21/43615* (2013.01); *H04N 21/472* (2013.01); *H04N 21/478* (2013.01); *H04W 4/80* (2018.02)

(58) Field of Classification Search
CPC ....... H04L 67/025; H04L 67/34; G06Q 10/02; G06Q 10/109; G06Q 50/12
USPC ....................................................... 709/225
See application file for complete search history.

(56) References Cited

U.S. PATENT DOCUMENTS

| | | | |
|---|---|---|---|
| 8,601,515 B2 | 12/2013 | Sparrell | |
| 8,650,597 B2 | 2/2014 | Park et al. | |
| 8,665,829 B2 | 3/2014 | Park et al. | |
| 8,667,518 B2 | 3/2014 | Kuijlaars | |
| 8,707,351 B2 | 4/2014 | Dharmaji | |
| 8,793,784 B2 | 7/2014 | Metivier et al. | |
| 9,353,551 B2* | 5/2016 | Martinez | E05B 47/0001 |
| 2005/0165651 A1* | 7/2005 | Mohan | G06Q 20/0453 |
| | | | 705/14.64 |
| 2010/0191551 A1* | 7/2010 | Drance | G06Q 10/02 |
| | | | 705/5 |
| 2012/0150601 A1* | 6/2012 | Fisher | H04W 4/21 |
| | | | 705/14.23 |
| 2012/0220222 A1 | 8/2012 | Hill | |

(Continued)

FOREIGN PATENT DOCUMENTS

| | | | | |
|---|---|---|---|---|
| KR | 10-2010-0090868 A | 8/2010 | | |
| WO | WO 2014007870 A1 * | 1/2014 | ......... | G07C 9/00904 |

*Primary Examiner* — Atta Khan
(74) *Attorney, Agent, or Firm* — Jefferson IP Law, LLP

(57) ABSTRACT

The present disclosure relates to a system, method and apparatus for providing access to plurality of services under the control of at least one near field communication (NFC) enabled service device and the method includes receiving, by a first device, a configuration file from a second device based on a proximity between the first device and the second device and providing access to at least one service corresponding to a reservation request based on control information included in the configuration file.

15 Claims, 25 Drawing Sheets

(56) References Cited

U.S. PATENT DOCUMENTS

| | | | |
|---|---|---|---|
| 2013/0024222 A1* | 1/2013 | Dunn | G07C 9/00571 |
| | | | 705/5 |
| 2013/0305292 A1 | 11/2013 | Chen et al. | |
| 2014/0053189 A1 | 2/2014 | Lee et al. | |
| 2015/0170448 A1* | 6/2015 | Robfogel | G07C 9/00904 |
| | | | 340/5.61 |

* cited by examiner

FIG. 7

| canoeing | spa | smokes tack | cocktail | games |
| --- | --- | --- | --- | --- |
| breakfast | desktop | running | gym | outdoor pool |
| massage | heating | bar | parking | safe |
| bath rooms | hiking | jacuzzi | garden | cable TV |
| Bathroom for disabled | home service | laundry | farm school | VOD |
| ski | sauna | kitchen | tasting | bar |
| dining | room service | equestrian | indoor pool | sauna |

SYSTEM, METHOD AND APPARATUS FOR PROVIDING ACCESS TO SERVICES

CROSS-REFERENCE TO RELATED APPLICATION

This application claims priority from 1984/DEL/2015 filed on Jul. 1, 2015, in the Indian Patent Office, the disclosure of which is incorporated herein in its entirety by reference.

BACKGROUND

1. Field of the Invention

The present disclosure relates to a system, apparatus and method of providing access to at least one service corresponding to a reservation request. More particularly, the present disclosure relates to a system, apparatus and method of making reservations for multiple services online, receiving a configuration file on a user device based on the reservations, and accessing the services using the user device. When the user attempts to access the services, a terminal authenticates the user device based on the configuration file before providing access to the services.

2. Description of the Related Art

In the hospitality industry, enhancing customer satisfaction is a priority. Faced with increased industry competition, many hotel operators are looking for smarter ways to maximize customer satisfaction and generate more revenue from their properties. Expanding how hotel customers access available services has proven to be a successful strategy for many hotels. Such services may include reserving a room, reserving a taxi, reserving a conference room, selecting from digital content available via a television, reserving a game room or game console, making a spa appointment, ordering food, making travel reservations, reserving a hospitality suite, or a combination thereof.

By way of a non-limiting example, electronic devices such as televisions, game consoles, etc. play an important role in providing services via which hotels can generate income. Hotel televisions are generally available either as standalone devices, which are capable of accessing local channels and satellite or cable programming, or as interactive televisions, which are capable of providing services such as video on demand or other paid services including movies, music, adult content, etc.

As shown in FIG. 1, in the case of televisions as standalone devices, hotel administration may setup the televisions such that only channels or content added to each particular television can be accessed by users/guests. In this manner, the televisions are categorized based on available content and placed in different types of rooms accordingly (e.g., premium, deluxe or luxury).

In the alternative, as illustrated in FIG. 2, hotel administration can program one or more tuner cards 201, 203, 205 to provide access to one or more channels or types of content. The cards are inserted into a device or a remote controlling the device to provide access the channels or content.

In the case of televisions 310 as interactive devices, as shown in FIG. 3, whenever guests press a button on the remote to select a pay-per-view channel or view any VOD content, a request is sent to a server 320. The server processes the request and grants access once either payment is completed or a billing amount is added to the guest's bill in a Property Management Server (PMS)/billing server 330.

To access service devices which are not free to use, guests may obtain access cards 410 from a service counter. Each access card has an associated username and password limiting the service level and other parameters as illustrated in FIG. 4. After logging in to a service device 420 using a username and corresponding password, a billing amount based on usage is added to the PMS/billing server 330, and the guest pays the bill when checking out from the hotel.

From the above-discussed scenarios, it is clear that guests must either seek assistance from hotel administration or stand in queues to gain access to one or more services. Moreover, in order to access different services, different access cards may be required, which can be confusing as well as inconvenient. In addition, guests have no privacy when accessing services in an unfamiliar environment. Although a record of each service used is by each guest is recorded for billing purposes, guests may wish to keep such records private.

A further problem faced by the guests is that while accessing service devices, guests may be presented with unfamiliar menus and user interfaces when using devices provided by the hotel for accessing services, and it may be more time consuming for guests to use these unfamiliar menus and user interfaces in comparison to personalized menus or favorites lists available on devices installed at the guests' homes.

In addition, hotel administration also faces several disadvantages. One such disadvantage is that device configurations have to be managed separately for accessing various services. Extra hardware such as different remote controls, control devices, access cards and the like must be provided to guests. There is always a risk that guests may not return the hardware items, and further, guest information stored on the hardware items is not always secured.

A further challenge faced by hotel administration is that the PMS/billing server 330 has to be maintained separately for billing information. The total billing amount for each guest, which is to be paid upon checkout, is stored on the PMS server. Maintaining a PMS/billing server 330 adds extra expense to service providers. In addition, guests have to stand in a queue at a service counter to pay for such services upon checkout, which is inconvenient to guests and may result in a loss of revenue due to customer dissatisfaction.

Inventions have been made in the past few years to reduce the burden on the hotel industry and provide better-personalized services to guests. Some of such inventions have been disclosed in US2012/0220222, KR20100090868, US2013949576 and U.S. Pat. No. 8,793,784. US 2012/0220222 discloses a wireless communication system including an electronic device with a first near field communication (NFC) device and a player device configured to play media content. The wireless communication device includes a second NFC device configured to communicate with the first NFC device based upon proximity, and a controller cooperating with the second NFC device and configured to transmit preference play information to the electronic device via the first NFC device. The player device is configured to play selected media content based upon the preference play information.

With the wireless communication system of US 2012/0220222, drawbacks include maintaining play configurations in individual player devices only, and the system does not include maintaining, arranging and authorizing multiple devices and their display contents and other parameters. In addition, many devices cannot be managed separately at the same time, and separate playback information cannot be loaded to devices based on choice. There is no categorization of preferred play information, which decreases usability of the devices in hospitality or Business-to-Business (B2B) environments. It is more or less fit for personal use only. Further, the mobile devices of the wireless system are very complicated and costly, and users are unable to obtain desired content using simple and inexpensive devices which do not require power, such as NFC tags.

KR20100090868 relates to a method of transmitting a user environment stored in a mobile terminal to an image display device. According to this invention, when the user uses a new image display device, the user can set the user environment on the new image display device according to the user environment of a previously used device.

The drawbacks associated with KR20100090868 are that it is limited to devices having similar internal SW/HW settings and is not applicable to multiple device types. In addition, there is no flexibility of services. Only user environments (internal configurations such as favorite channels, window, brightness, etc.) are disclosed.

US2014/0053189 discloses an apparatus for providing a personalized home screen, in which the apparatus includes a user identification unit configured to receive user identification information comprising login information and biometric information of a user and a home screen processing unit configured to identify the user by comprising the received user identification information with a collection of user personal information of multiple users and searching for user personal information corresponding to the received user identification information, and to display a personalized home screen based on the user personalization information of the identified user.

Drawbacks associated with US2013949576 are that devices are limited to providing only personalized user interfaces. User identification is based on prior saved information, and only a user interface corresponding to the user is launched. The invention discloses arranging a home screen (boot screen) on an image display device, more specifically a TV. However, the invention does not disclose arranging display contents and services.

U.S. Pat. No. 8,793,784 relates to lock devices electrically controlled by means of a dematerialized and encrypted key, wherein such key can be conveyed by a portable object held by a user, such as a portable phone, a contactless badge or card, etc. The invention is limited to physical security or authentication by having a control key in a personal device for opening a lock, and the control key is transmitted through NFC. In addition, devices handled are single lock devices.

Keeping in view all of the above, there is an unmet need for providing an improved system, apparatus and method of providing personalized services to customers in hospitality or B2B environments that address one or more of the problems identified above.

Apart from overcoming the disadvantages discussed above, one object of the present invention is to provide access to at least one service corresponding to a reservation request made by a user online. Further, the user may access the services via one or more NFC enabled service devices by tapping a personal/portable device of the user to the one or more NFC enabled service devices.

Another object of the invention is to enable hospitality and Business-to-Business (B2B) industries to provide services to a user in advance of user arrival. Service providers or hotel administration can display available content & services by means of a mobile application or a hotel website. A user can reserve any of the displayed services or content and then receive a configuration file on a user device based on the reservations. Service devices can be configured according to the user's reservations when the user taps the user device of the user to the one or more NFC enabled service devices.

Another object of the invention is that a user will not have to scroll through User Interface (UI) options in order to access content of their choice on service devices such as a television. When the user taps a user device to a service device, the service device will arrange and display contents and items according to the user's pre-booked choices, increasing convenience and improving customer satisfaction. Using service devices configured according to the user's preferences will allow users to feel as if they are using their own devices having personalized content.

Another object of the present invention is to provide enterprise mobility and an integrated payment system. Enterprises will not have to maintain Property Management Server (PMS) servers to maintain runtime-billing information according to an exemplary embodiment.

Another object of the present disclosure is to provide privacy to guests at a hotel. Generally, billing information for content & services may indicate content watched, services accessed, and billing amount corresponding to the guest's stay, and guests may wish to keep such records private. With a combined integrated billing system, the accessed services will be known only to the guest.

Another object of the present disclosure is to remove the requirement for in-person assistance or any other hurdles in an unfamiliar environment. All services can be booked in advance and can be accessed with personal device. A user does not have to stand in a queue at service counters, call a service representative to gain access to a room or service, manually enter passwords, or maintain numerous documents, pay slips or currency.

SUMMARY

According to an exemplary embodiment, provided is a method of providing access to at least one service, the method comprising: receiving, over a network, a reservation request for the at least one service, generating a configuration file corresponding to the reservation request; and transmitting, to at least one device, the configuration file which allows the at least one device to access the at least one service based on control information included in the configuration file.

According to one aspect, the present disclosure relates that the request is at least one of reserving a hotel room, reserving a taxi, reserving a conference room, selection of digital content, reserving a game room or game console, making a spa appointment, ordering food, making travel reservations, reserving a hospitality suite.

According to another aspect, the present disclosure relates to the configuration file comprising at least one of reservation details, reservation time, user information, device information corresponding to one or more devices, list of content, service type, access frequency of the at least one service, number of services, payment information, and transaction information.

According to another aspect, the present disclosure relates to the request being made by a user via a mobile application or a web application.

According to another aspect, the present disclosure relates to the at least one service including access to a plurality of content available via a content renderer, the plurality of content including at least one of audio content, video content, multimedia content, and gaming content.

According to another aspect, the present disclosure relates that the configuration file is an encoded file.

According to another aspect, the present disclosure relates that the transmitting is performed based on a proximity between the at least one device and a service device which provides the at least one service.

According to another aspect, the present disclosure relates that the transmitting is performed via near field communication between the at least one device and the service device.

According to another aspect, the present disclosure relates that the device is a mobile device or a tag.

According to another aspect, the present disclosure relates that wherein the configuration file is a confirmation of the reservation request.

According to another exemplary embodiment, provided is an apparatus for providing access to at least one service, said apparatus comprising: a receiver configured to receive, over a network, a request for the at least one service via near field communication (NFC), a processor configured to generate a configuration file corresponding to the request; and a transmitter configured to transmit, to at least one device over the network, the configuration file which allows the at least one device to access the at least one service based on control information included in the configuration file.

According to another exemplary embodiment, provided is A method of providing access to at least one service, the method comprising: receiving, by a first device, a configuration file from a second device based on proximity between the first device and the second device; and providing, by the first device, access to at least one service corresponding to a reservation request, wherein the providing of the access is based on control information included in the configuration file.

According to another aspect, the present disclosure relates that the configuration file is an encoded file, and the method further comprises, after receiving the configuration file, decoding the configuration file.

According to another aspect, the present disclosure relates that the method further comprises rendering, by the first device, a user interface comprising the at least one service based on the configuration file, and the providing of the access comprises providing access to the at least one service based on a user selection via the user interface.

According to another aspect, the present disclosure relates that the at least one service includes access to a plurality of content including at least one of audio content, video content, multimedia content, and gaming content.

According to another aspect, the present disclosure relates the rendering of the user interface comprises: analyzing content included in the configuration file; and generating the user interface comprising the at least one service based on content included in the configuration file.

According to another aspect, the present disclosure relates the second device receives the configuration file over a network, based on the reservation request, before the first device receives the configuration file from the second device.

According to another aspect, the present disclosure relates that the providing of access to the at least one service further comprises: analyzing, by an analyzer, the user selection; and providing the access to the at least one service based on the user selection.

According to another aspect, the present disclosure relates that the providing of access to the at least one service further comprises: retrieving content corresponding to the user selection from a storage device.

According to another aspect, the present disclosure relates that the providing of access to the at least one service further comprises: transmitting, by the first device, the user selection; and receiving, by the first device, content corresponding to the user selection.

According to another exemplary embodiment, provided is a device for providing access to at least one service, the device comprising: a receiver configured to receive a configuration file from another device based on proximity between the device and the other device; and a controller configured to provide access to at least one service corresponding to a reservation request; wherein the controller is configured to provide the access based on control information included in the configuration file.

According to another exemplary embodiment, provided is a method of providing access to at least one service, the method comprising: receiving, by a device, a configuration file corresponding to a reservation request for a service; and transmitting, by the device, the configuration file to at least one other device, based on proximity between the device and the at least one other device; wherein the at least one other device is configured to provide access to the at least one service based on control information included in the configuration file.

According to another aspect, the device is a mobile device or a tag.

These and other aspects as well as advantages will be more clearly understood from the following detailed description taken in conjugation with the accompanying drawings and claims.

BRIEF DESCRIPTION OF THE
ACCOMPANYING DRAWINGS

To further clarify advantages and aspects of the disclosure, a more detailed description of the invention will be rendered by reference to specific exemplary embodiments thereof, which is illustrated in the appended drawings. It will be understood that these drawings depict only typical exemplary embodiments of the inventive concept and are therefore not to be considered limiting of its scope. The inventive concept will be described and explained with additional specificity and detail with the accompanying drawings in accordance with various example embodiments of the invention, in which:

FIG. 7 illustrates a list of services available for online booking in accordance with exemplary embodiments.

Figure 1:
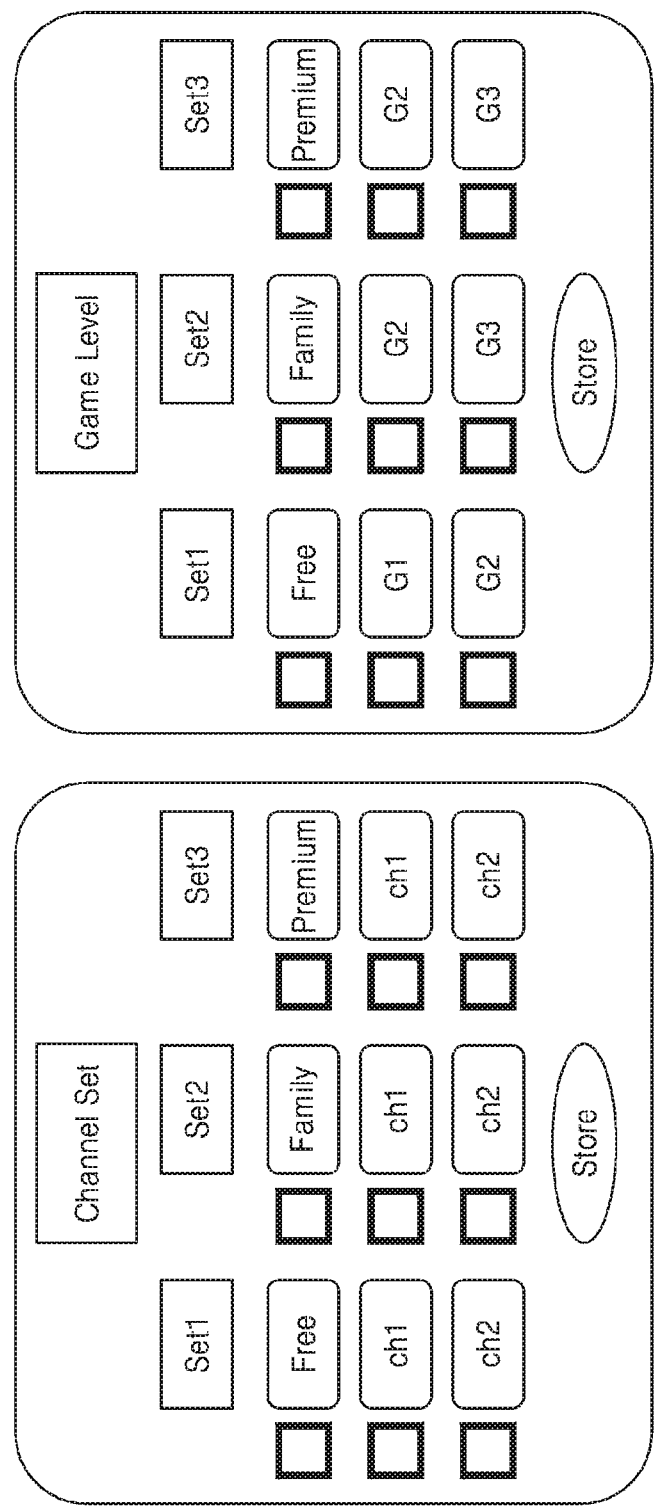
FIG. 1 through FIG. 4 are used to illustrate a method of providing selected content in the case of standalone and interactive devices.
Figure 2:
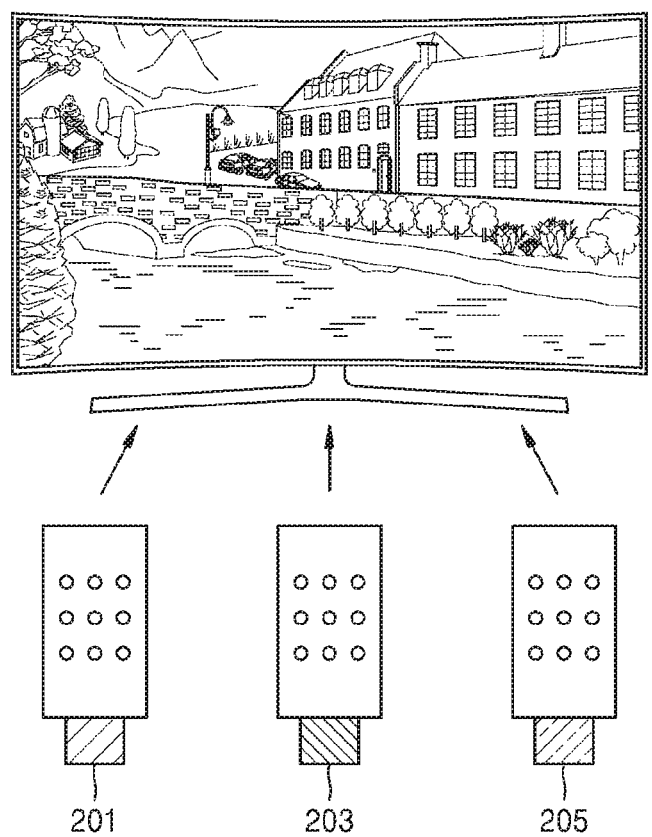
Figure 3:
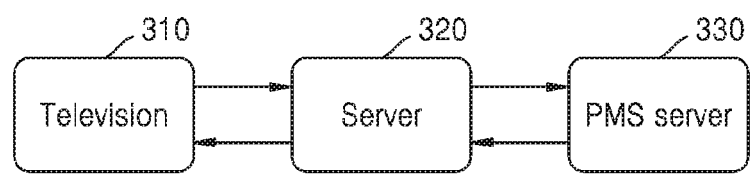
Figure 4:
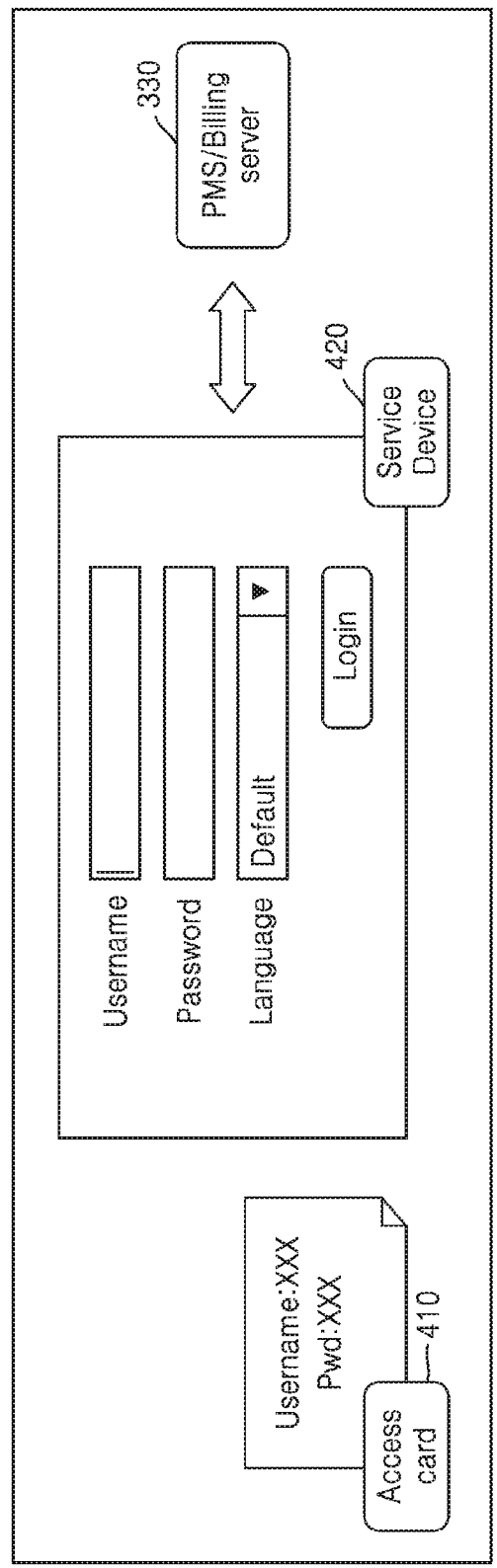

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, one or more elements may have been represented in the drawings by conventional symbols, and the drawings may show only those specific details that are pertinent to understanding exemplary embodiments of the invention so as not to obscure the drawings with details that will be readily apparent to those of ordinary skill in the art having benefit of the description herein.

DETAILED DESCRIPTION

It should be understood at the outset that although illustrative implementations of exemplary embodiments of the present disclosure are illustrated below, the embodiments may be implemented using any number of techniques, whether currently known or in existence. The present disclosure should in no way be limited to the illustrative implementations, drawings, and techniques illustrated below, including the exemplary designs and implementations illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some exemplary embodiments" may refer to no exemplary embodiments or to one embodiment or to several exemplary embodiments or to all example embodiments. Accordingly, the term "some exemplary embodiments" is defined as meaning "no embodiment, or one embodiment, or more than one embodiment, or all exemplary embodiments."

The terminology and structure employed herein is for describing, teaching and illuminating some exemplary embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference may be made herein to some "exemplary embodiments." It should be understood that an exemplary embodiment is an example of a possible implementation of any features and/or elements presented in the attached claims. Some exemplary embodiments have been described for the purpose of illuminating one or more of the potential ways in which the specific features and/or elements of the attached claims fulfill the requirements of uniqueness, utility and non-obviousness.

Use of the phrases and/or terms such as but not limited to "a first embodiment," "a further embodiment," "an alternate embodiment," "one embodiment," "an exemplary embodiment," "multiple exemplary embodiments," "some exemplary embodiments," "other exemplary embodiments," "further embodiment", "furthermore embodiment", "additional embodiment" or variants thereof do NOT necessarily refer to the same exemplary embodiments. Unless otherwise specified, one or more particular features and/or elements described in connection with one or more exemplary embodiments may be found in one exemplary embodiment, more than one exemplary embodiment, all exemplary embodiments, in none of the exemplary embodiments. Although one or more features and/or elements may be described herein in the context of only a single embodiment, or alternatively in the context of more than one embodiment, or further alternatively in the context of all exemplary embodiments, the features and/or elements may instead be provided separately or in any appropriate combination or not at all. Conversely, any features and/or elements described in the context of separate exemplary embodiments may alternatively be realized as existing together in the context of a single embodiment.

Any particular and all details set forth herein are used in the context of some exemplary embodiments and therefore should NOT be necessarily taken as limiting factors to the attached claims. The attached claims and their legal equivalents can be realized in the context of exemplary embodiments other than the ones used as illustrative examples in the description below.

Since the present inventive concept may have various modifications and several embodiments, exemplary embodiments are shown in the drawings and will be described in detail. Advantages, features, and a method of achieving the same will be specified with reference to the embodiments described below in detail together with the attached drawings. However, the embodiments may have different forms and should not be construed as being limited to the descriptions set forth herein.

It will be understood that although the terms "first", "second", etc. may be used herein to describe various components, these components should not be limited by these terms. These components are only used to distinguish one component from another.

Singular expressions, unless defined otherwise in contexts, include plural expressions.

When an embodiment is implementable in another manner, a predetermined process order may be different from a described one. For example, two processes that are consecutively described may be substantially simultaneously performed or may be performed in an opposite order to the described order.

Also, terms such as " . . . unit", "module", etc. described in the present disclosure mean an element executing at least one function or an operation, and may be realized as hardware, software, or a combination of hardware and software.

Figure 5:
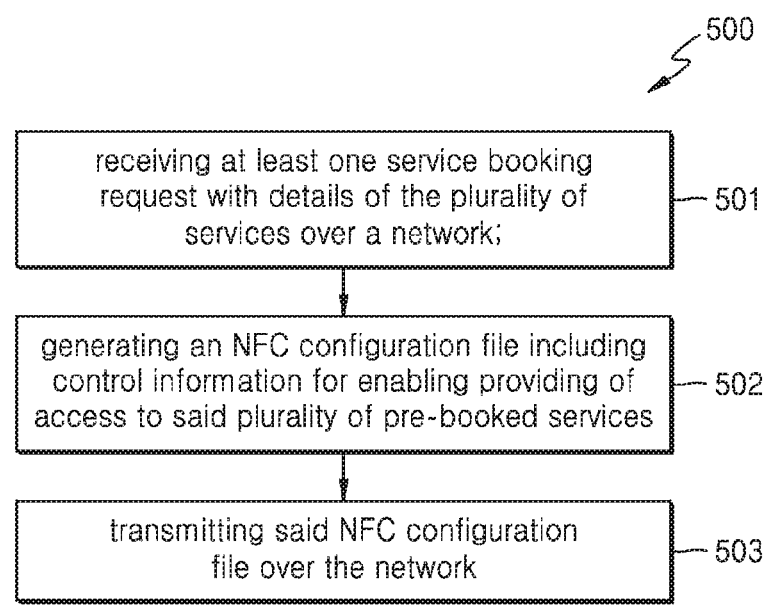
FIG. 5 illustrates an exemplary method of enabling an NFC device to provide access to a service in accordance with exemplary embodiments.
Figure 6:
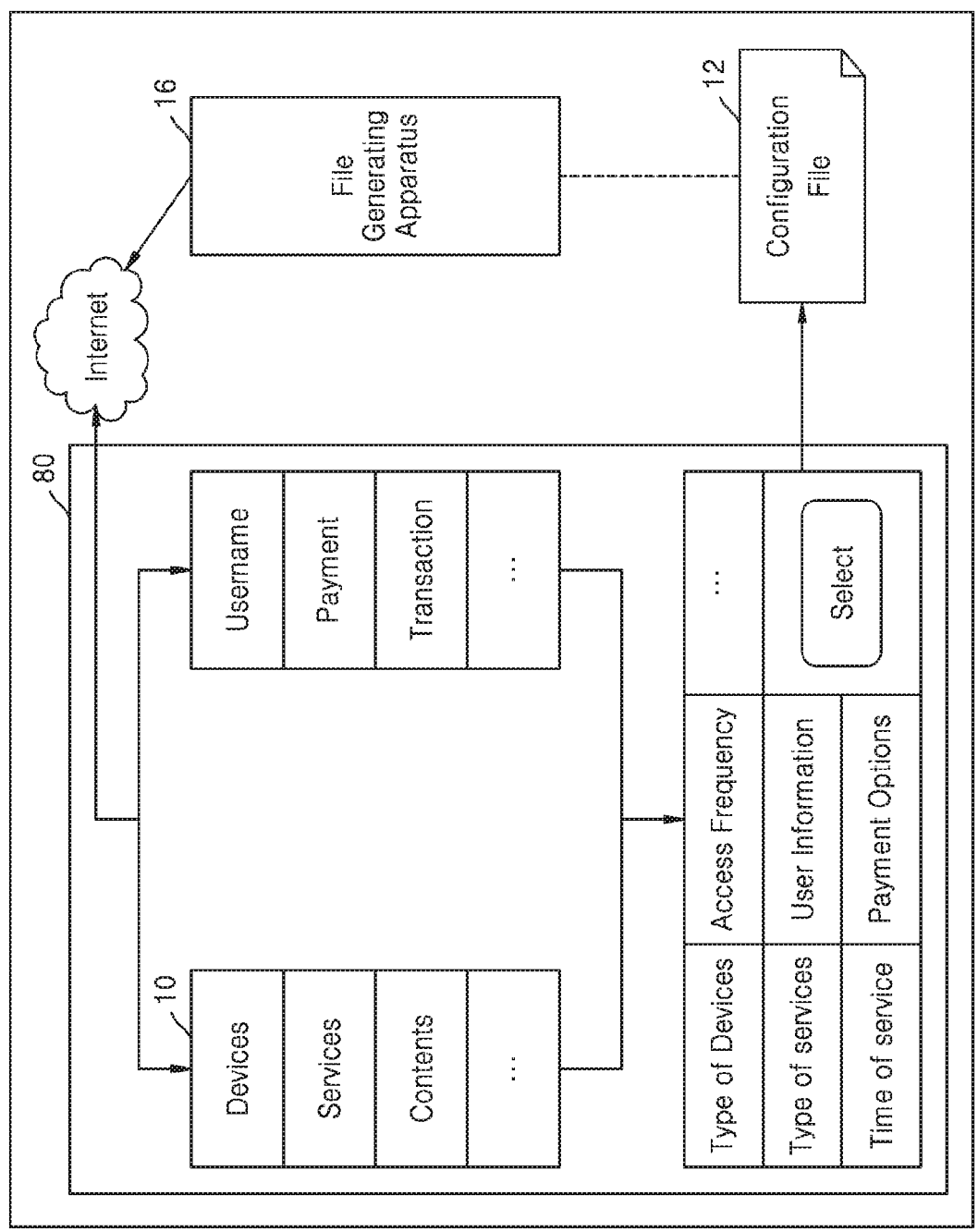
FIG. 6 illustrates an application for online booking of one or more services in accordance with exemplary embodiments.

FIG. 5 illustrates an exemplary method of enabling a service device 10 to provide access to a service corresponding to a reservation request. FIG. 6 illustrates an application for booking of the service via the service device 10 in accordance with exemplary embodiments. The application may be a mobile or web application.

The method includes receiving, over a network, at least one reservation request for a service (e.g., a request for pre-booking a service) at step 501, generating a configuration file 12 corresponding to the at least one reservation request at step 502 and transmitting the configuration file 12 over the network at step 503.

The at least one service device 10, upon receiving the configuration file 12, may access the service based on control information included in the configuration file 12.

The reservation request may be made by a user via an application 14. The application 14 may be, for example, a mobile application, a web application, an enterprise mobile application, or an enterprise web application. As illustrated in FIG. 6, the application 14 may display, for example, a list of services, a list of service devices 10, content, service clauses, etc. By way of a non-limiting example, a user may choose one or more services included in the list. A file generating apparatus 16 may check a database to determine whether service devices 10 corresponding to the one or more chosen services are available. Upon finding available service devices 10 corresponding to the one or more chosen services, the file generating apparatus 16 may process the request, authorize service devices 10 for providing the service, and send a reservation confirmation to the user. In the alternative, the user may select one or more available service devices 10 and also the services associated with the selected service devices 10. The application 14 may also present the user with the service clauses for using the one or more selected service devices 10, for example, duration of services, access frequency for using the services and the like. The user may make a reservation request for one or more services displayed on the application 14.

A file generating apparatus 16 may receive the reservation request. The file generating apparatus 16 may be a server or, for example, a backend server. The file generating apparatus 16 may generate a configuration file 12 based on the selected service device 10, the list of selected services associated with the selected service device 10 and service clauses, and may further create the configuration file 12 based on various parameters. The file generating apparatus 16 may transmit the configuration file 12 to the application 14 as confirmation of the reservation. The configuration file 12 may be transmitted to a user device 18 (to be shown later regarding FIG. 14) such as an NFC device or an NFC tag. The file generating apparatus 16 may provide payment options to a user prior to generating the configuration file 12. The configuration file 12 may be generated after the user completes payment for the reservation.

The reservation requests may include reserving a hotel room, reserving a taxi, reserving a conference room, selecting from digital content available via on a hotel television, reserving a game room or game console, making a spa appointment, ordering food, making a travel reservation, reserving a hospitality suite, or a combination thereof as illustrated in FIG. 7.

Figure 8:
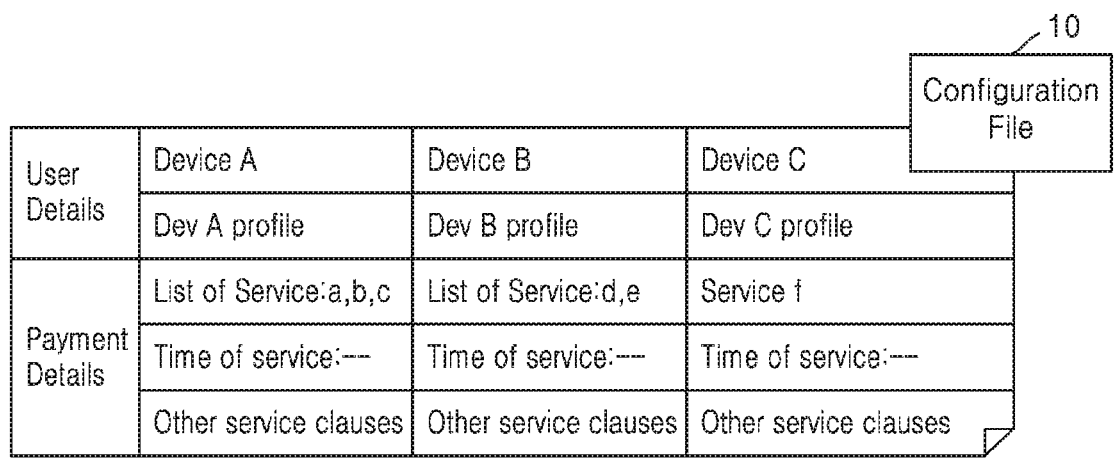
FIG. 8 illustrates content of a configuration file in accordance with exemplary embodiments.

The configuration file 12 may include details indicating at least one of reservation details, time of service, user information, device information corresponding to one or more device, list of content, service type, frequency of use of services, number of services, payment information, and transaction information, as illustrated in FIG. 8.

Figure 9:
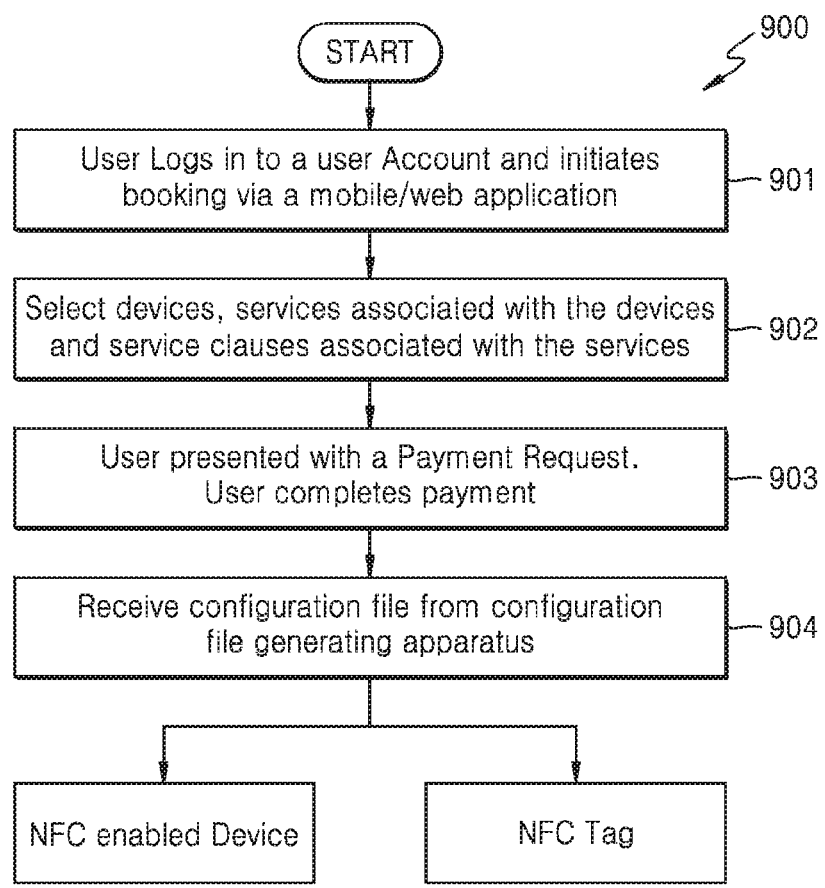
FIG. 9 is a flowchart illustrating online booking of one or more services by a user by means of a mobile/web application in accordance with an exemplary embodiment.

FIG. 9 is a flowchart illustrating online booking of one or more services by a user via an application 14, in which the file generating apparatus 16 sends a configuration file 12 to the application 14 as confirmation of the reservation.

At step 901, the user logs in to a user account via the application 14 to make a reservation. At step 902, the user makes a reservation request for one or more services displayed on the application 14. When making the reservation request, the user may select one or more service devices 10 to receive access to the services. After the selection of services, the user is presented with payment options at 903. The user may choose to make immediate payment or add the amount to the user's account. Upon completion of payment by the user, the file generating apparatus 16 generates configuration file 12 and transmits the configuration file 12 to the application 14 over a network. The application 14 receives the configuration file 12 as confirmation of the reservation at step 904. The configuration file 12 may be transmitted to the selected service devices 10. The service devices 10 may be, for example, NFC enabled devices or NFC tags.

Figure 10:
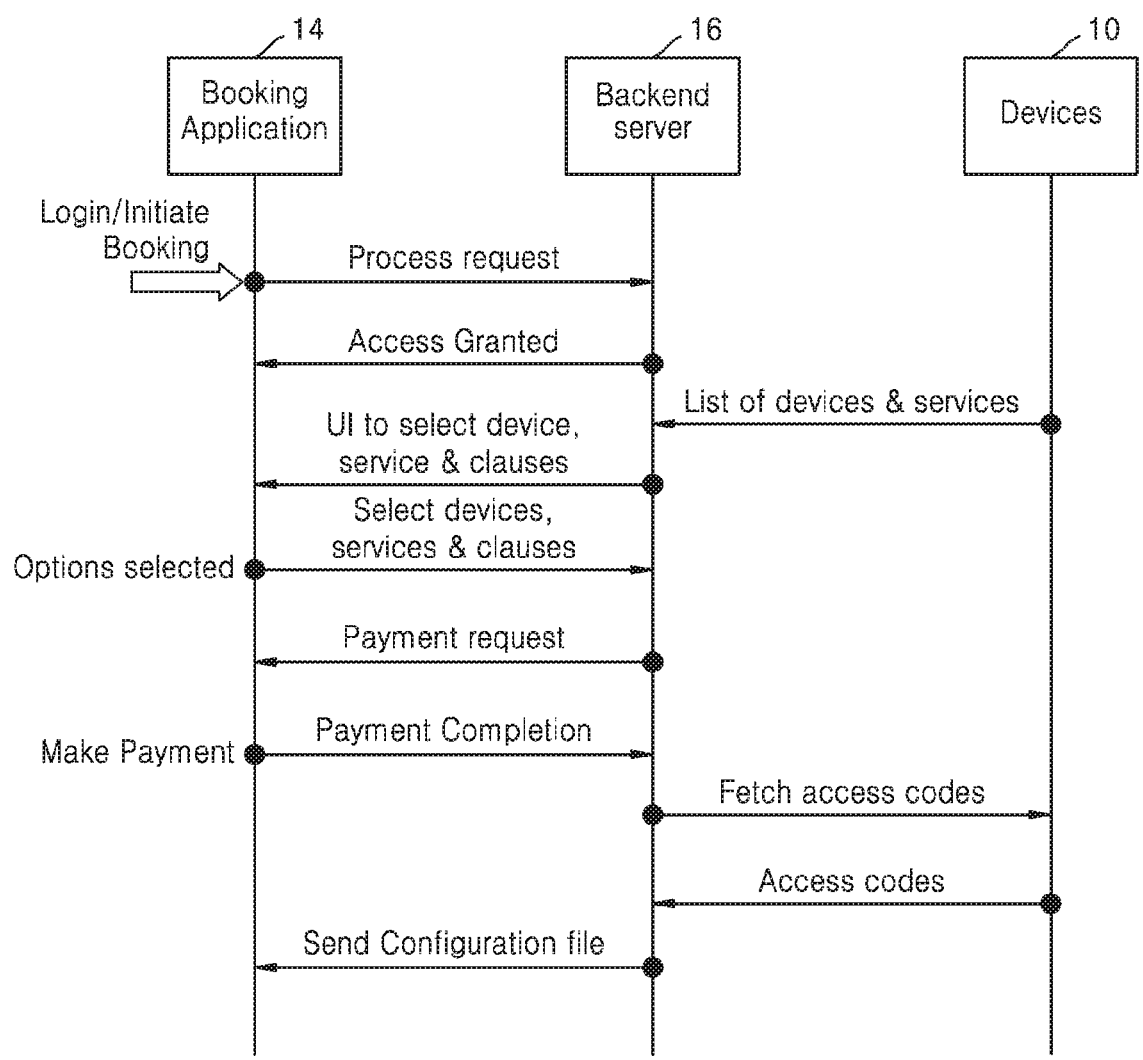
FIG. 10 illustrates the creation of a configuration file by a file generating apparatus in accordance with an exemplary embodiment.

FIG. 10 illustrates the creation of the configuration file 12 by the file generating apparatus 16. The user may log in to a user account via the application 14 and initiate a reservation request for a service. The application 14 displays lists generated by the file generating apparatus 16. The lists may include a list of service devices 10, a list of services associated with the service devices 10, and service clauses. The file generating apparatus 16 may generate the lists based on, for example, data input by users (e.g., hotel staff) or data which the file generating apparatus 16 directly receives from the service devices 10. The lists are transmitted to the application 14 and may be displayed via a user interface of the application 14. The user may select one or more services from the lists, and the file generating apparatus 16 may save the user's selections.

Thereafter, the user is presented with payment options. The user may choose to make immediate payment or add the amount to the user's account. Upon completion of payment by the user, the file generating apparatus 16 generates configuration file 12. The file generating apparatus 16 then transmits the configuration file 12 to the application 14 as confirmation of the reservation.

Figure 11:
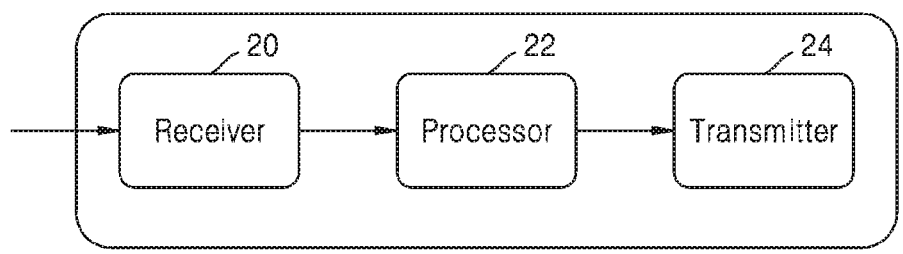
FIG. 11 illustrates components of a file generating apparatus in accordance with exemplary embodiments.

FIG. 11 illustrates the file generating apparatus 16 generating a configuration file 12. The file generating apparatus 16 includes a receiver 20, a processor 22 and a transmitter 24. The receiver 20 receives at least one reservation request for a service (e.g., a request for pre-booking a service). The processor 22 generates a configuration file 12 corresponding to the at least one reservation request. The transmitter 24 transmits the configuration file 12 to an application 14 in use by the user.

Figure 12:
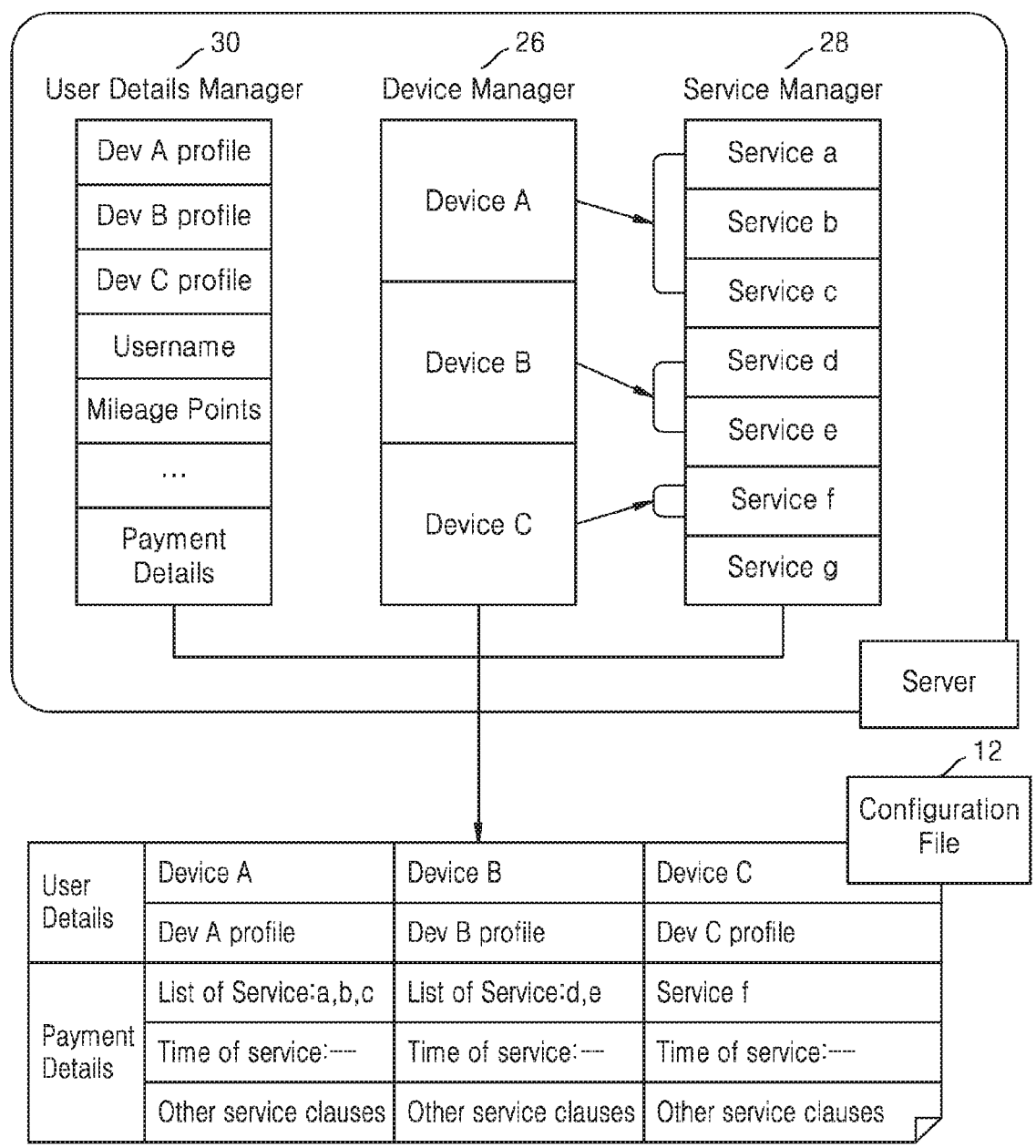
FIG. 12 illustrates components of a processor of a file generating apparatus in accordance with exemplary embodiments.

FIG. 12 illustrates the components/modules of processor 22 involved in generation of the configuration file 12. The processor 22 includes a Device Manager Module 26, a Service Manager Module 28, a User Details Manager Module 30, a File Generator Module 32 (not shown), an Encryption/Decryption Module 34 (not shown), and a Monitor Module 36 (not shown).

Device Manger Module—The Device Manager Module 26 may maintain a list of service devices 10 available for services. Each service device 10 is mapped to a list of services it is able to provide access to and a user profile. The Device Manager Module 26 may render the complete list of service devices 10 in a UI format on the application 14, wherein the user can choose any of the service devices 10 from the available list of service devices. The Device Manager Module 26 may send the list of service devices 10 selected by the user to the File Generator Module 32. The Device Manager Module 26 may create control files for each service device 10 based on mapping of services.

Service Manager Module—The Service Manager Module 28 may maintain a list of services and map the same to the service devices 10. As illustrated in FIG. 12, Device A is able to provide access to services a, b, and c which have been selected by the user. Device B is able to provide access to services d and e which have been selected by the user. Device C is able to provide access to service f, and service g has not been selected by the user. The Service Manager Module 28 may render the complete list of services in a UI format on the application 14, wherein the user can choose one or more services associated with service devices 10. The Service Manager Module 28 may send the list of services selected by the user to the File Generator Module 32.

User Details Manager—The User Details Manager Module 30 may manage details such as, for example, user names, device profiles, reward points, and payment details.

File Generator Module—The File Generator Module 32 may create a configuration file 12 based on the inputs received from the Device Manager Module 26 and the Service Manager Module 28. As illustrated in the FIG. 12, the configuration file 12 is in a list format. In the list format, a header has basic user details & payment details. Based on the number of NFC enabled service devices provided by the Device Manager, one or more sub-lists may be generated. Each sub-list is provided a separate header in which the name and basic information of a service device is saved. A list of services associated with each service device 10 is linked to a header sub-list mapped thereto. Service clauses corresponding to the services accessible by the service devices 10 are also linked to the headers corresponding thereto. In this manner, the configuration file 12 may include headers and sub-lists.

Encryption/Decryption Module—The module 34 adds security to configuration file 12 exchanged between the file generating apparatus 16 and the user device 18. The configuration files 12 are encrypted before sending to the user device 18 to prevent theft and secure the same. On receiving configuration file 12 from the service device 10, in the case of interactive devices, the configuration file 12 is decrypted.

Monitor Module—The Monitor Module 36 controls all the connected devices including file generating apparatus 16, portable devices 18 and service devices 10. The devices may be connected through wired/wireless means. Configuration files 12 are transmitted from the file generating apparatus 16 to service devices 10 by said module 36.

Figure 13:
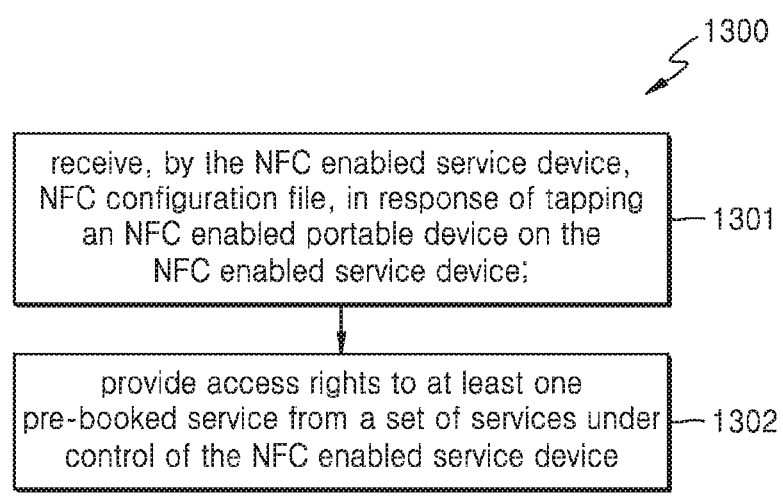
FIG. 13 illustrates a method of providing access to a service corresponding to a reservation request in accordance with exemplary embodiments.

FIG. 13 illustrates a method 1300 of providing access to a service corresponding to a reservation request. The method includes receiving, by the service device 10, a configuration file 12, in response to tapping a user device 18 on the service device 10 at step 1301. At step 1302, based on the configuration file 12, the service device 10 grants access to at least one pre-booked service among a set of services controlled by the service device 10. Although "tapping" is disclosed above, it is understood that the service device 10 may receive a configuration file 12 based on a proximity between the user device 18 and the service device 10. For example, the service device 10 and the user device 18 may communicate via radio-frequency identification (RFID) or near field communication (NFC) communication.

Further, although the method according to an exemplary embodiment describes services under control of service devices which may be NFC enabled, the inventive concept is not limited thereto. In another example, the service device 10 may be any device capable of communicating wirelessly or via a wire with another device. For example, user device 18 may transfer the configuration file 12 to the service device 10 (for example, 'Dev A' in FIG. 14) via a wired or wireless network, for example, via a LAN connection, WAN connection, Bluetooth, a direct wired connection, etc. In an exemplary embodiment, the user device 18 may transmit a configuration file 12 to the service device 10, and vice versa, based on whether both devices 10 and 18 are connected to the same network.

Figure 14:
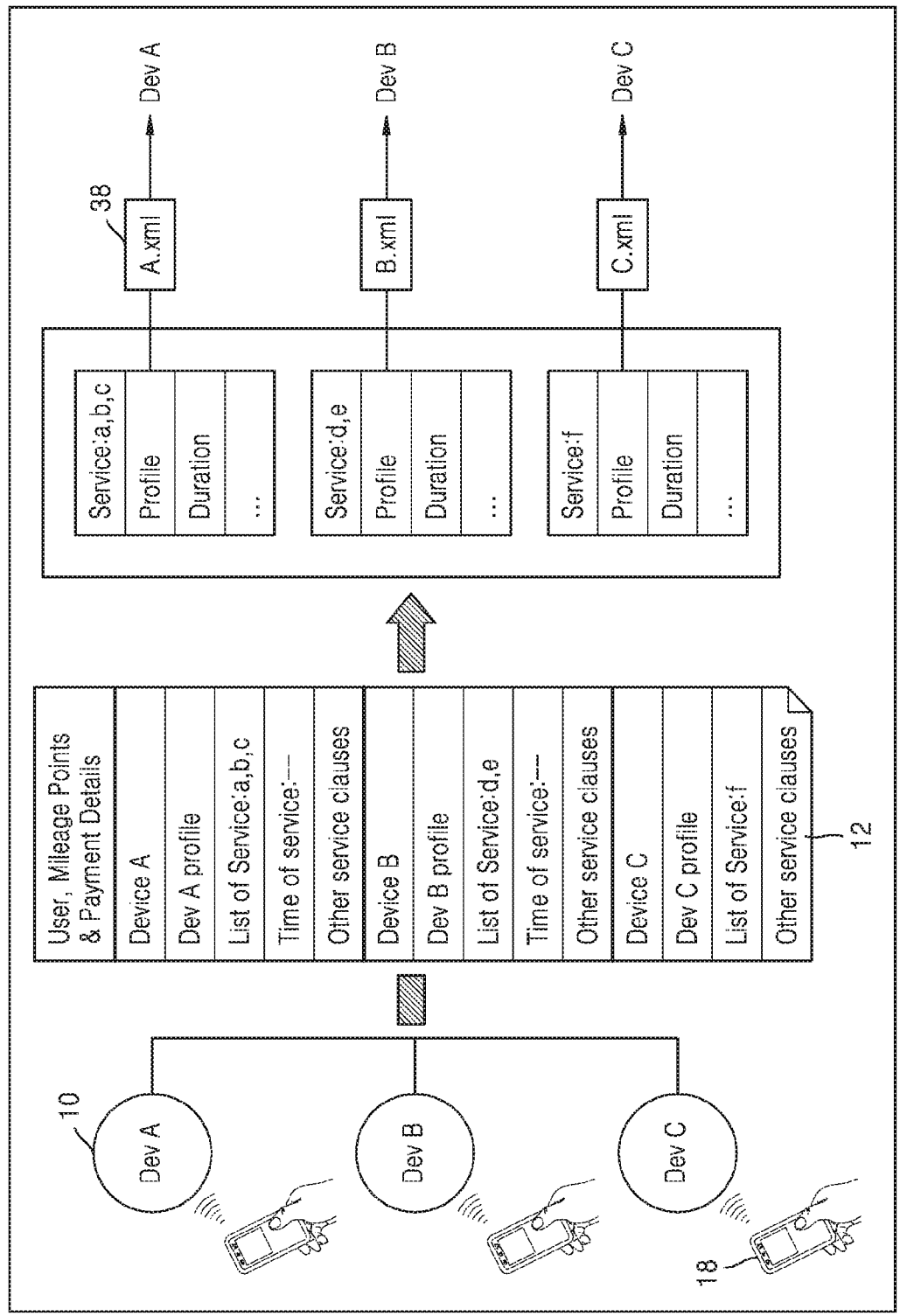
FIGS. 14 and 15 are used to illustrate transmission of a configuration file from a user device to one or more service devices in accordance with exemplary embodiments.
Figure 15:
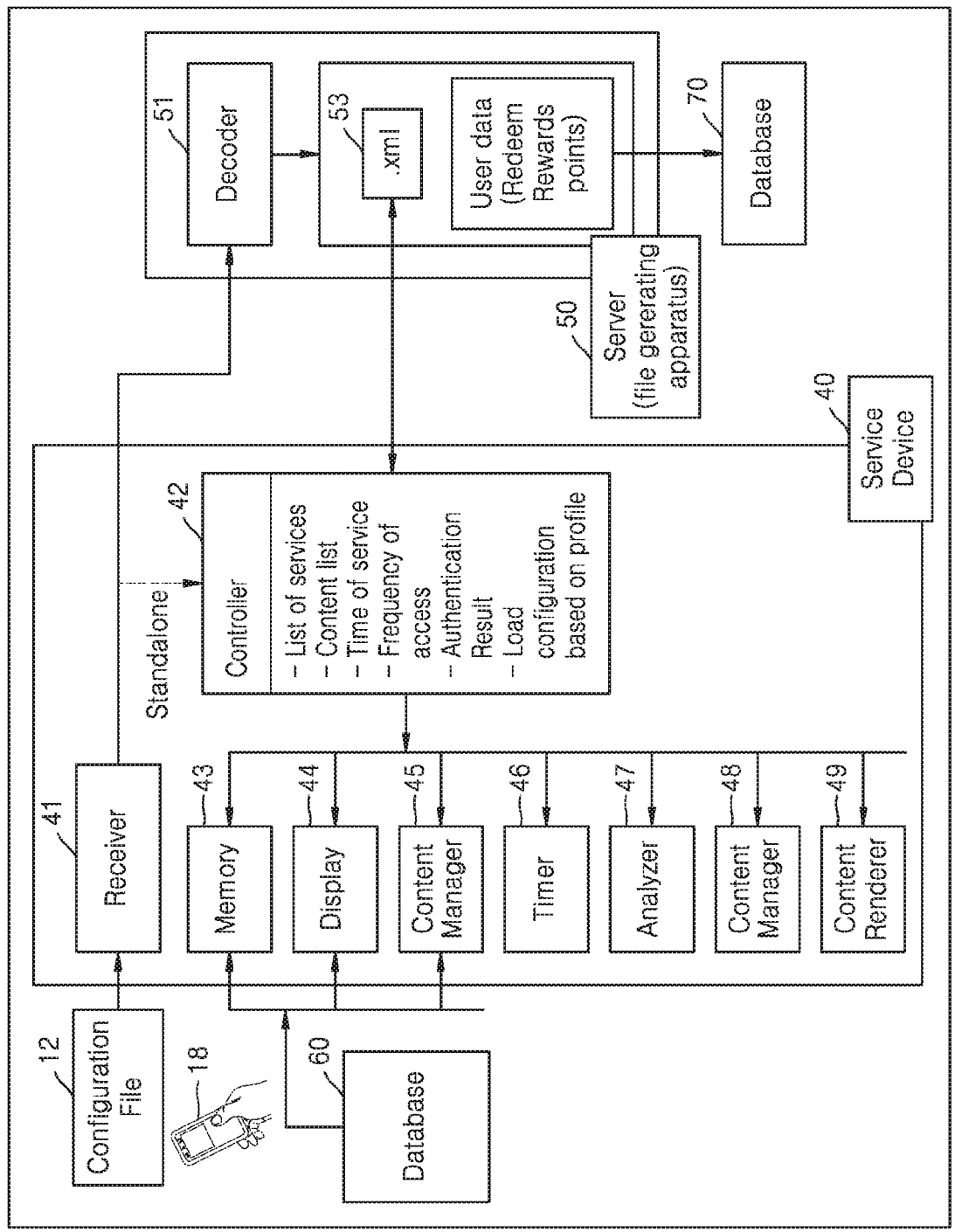

The transmission of said configuration file 12 from the user device 18 to one or more service devices 10 is further illustrated in FIG. 14 and FIG. 15. The user device 18 may transmit a configuration file 12 stored therein to one or more service devices 10 upon tapping the user device 18 thereto. The configuration file 12 may be encrypted to prevent theft thereof and secure the same. The service device 10 may decrypt and process the configuration file 12 to provide the service device 10 with access to pre-booked services under control of the service device 10 (i.e., the service device 10 may be a standalone device). Alternatively, an NFC device may send the configuration file 12 to a server, and the server may generate one or more control files 38 comprising one or more control functions from each sub-list of the configuration file 12 (i.e., the service device 10 may be an interactive device). The server may send the control files 38 to the service device 10, which may then process the control files 38 to access the pre-booked services under control of the service device 10. The control files 38 may be in formats known in the art including xml, json, csv, dat, PHP serialized, PHP associative and the like.

In the case in which the service device 40 is a standalone device, the configuration file 12 is decrypted/decoded and processed by the service device 40 without any involvement from a backend server. The service device 40, on receiving configuration file 12 from receiver 41, transmits the configuration file 12 to a controller 42. The controller 42 may identify data corresponding to said service device 40 from the configuration file 12 and ignore remaining information in the configuration file 12. The control functions in the identified data provide the user device 18 with access rights to at least one pre-booked service included among the set of services controlled by the service device 40. Based on the control functions, the controller 42 may adjust services, timers, memory, etc. and other service clauses for the service device 40. For example, the controller 44 may update a list of contents and set usage permissions (for example, duration or available times) for the pre-booked services. A display 44 of service device 40 may indicate whether a user device 18 has been successfully authenticated.

The service device 40 further generates the user interface via which a user may select pre-booked services. The user interface may be rendered by a content renderer 49. The content renderer may display the selectable pre-booked services as audio content, video content, multimedia content or gaming content. Upon selection of a pre-booked service from a list of services displayed on the user interface, the selection is analyzed by an analyzer 47, and access rights to the pre-booked service corresponding to the selection are provided to the user device 18.

In the case of in which the service device 40 is an interactive device included in an interactive system, the service device 40, upon receiving a configuration file 12, may send the configuration file 12 to a file generating apparatus 50, which decrypts and decodes the configuration file 12 and creates one more control files 53 from each sub-list of the configuration file 12. The control files 53 include one or more control functions for providing access rights to the user device 18 to at least one pre-booked service included among a set of services controlled by the service device 40. The service device 40 receives control files 53 corresponding to pre-booked services included among services controlled by the service device 40. The control files 53 generated by the file generating apparatus 50 may include service clauses, decryption keys, user data reward points, redeemable points, etc. The UI pages are rendered by means of a content renderer 49 of the service device 40. The content renderer may display the selectable pre-booked services as audio content, video content, multimedia content or gaming content. Upon selection of a pre-booked service from a list of services displayed on the user interface, the selection is transmitted to the file generating apparatus 50 or another server, which may then fetch content corresponding to the selection and transmit the content to the service device 40.

Figure 16:
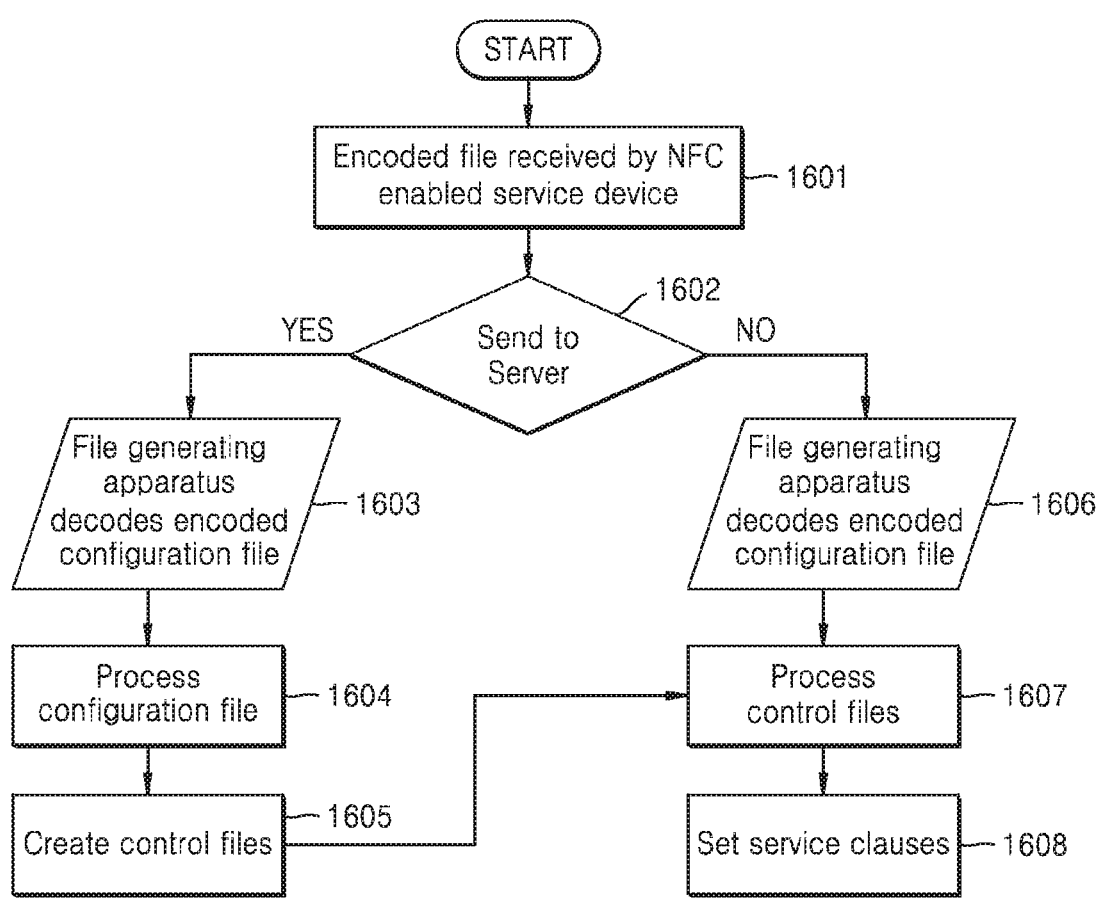
FIG. 16 is a flowchart illustrating the processing of the configuration file in the case in which a service device is a standalone device and interactive devices in accordance with exemplary embodiments.

FIG. 16 is a flowchart illustrating the processing of the configuration file 12 in the case in which a service device 10 a standalone device 40 or an interactive device. At step 1601, a service device 10 receives a configuration file 12 that is encoded. At step 1602, the service device 10 may send a request to the file generating apparatus 16 for decryption and processing of the configuration file 12 or perform the decryption and processing without assistance from the file generating apparatus 16 (e.g., server), based on the device type of the service device 10 (i.e. whether the service device 10 is a standalone device or an interactive device) and mode of operation thereof.

In the case in which the service device 10 is an interactive device, at step 1603, the service device 10 sends the configuration file 12 to a file generating apparatus 16, and the file generating apparatus 16 decodes the configuration file 12 using decryption algorithms. At steps 1604 and 1605, the file generating apparatus 16 processes the decoded configuration file 12, creating control files 38 from each sub-list of the configuration file 12, and the file generating apparatus 16 may send the decoded configuration file 12, along with control files 38 including control information, to the service device 10. At step 1607, the service device 10 may process the control files, and a content renderer included in the service device 10 may render a user interface corresponding to pre-booked services by using an internal software algorithm. At step 1608, a controller included in the service device 10 may update details of service clauses including usage permissions regarding duration, access frequency, and the like, for example, by updating timers, counters and other components/modules of the service device 10.

In the case in which the service device 10 is a standalone device, at step 1606, the service device 10 decodes the configuration file 12 using decryption algorithms. At step 1607, the service device 10 may process the control files, and a content renderer included in the service device 10 may render a user interface corresponding to pre-booked services by using an internal software algorithm. At step 1608, a controller included in the service device 10 may update details of service clauses including usage permissions regarding duration, access frequency, and the like, for example, by updating timers, counters and other components/modules of the service device 10.

Figure 17:
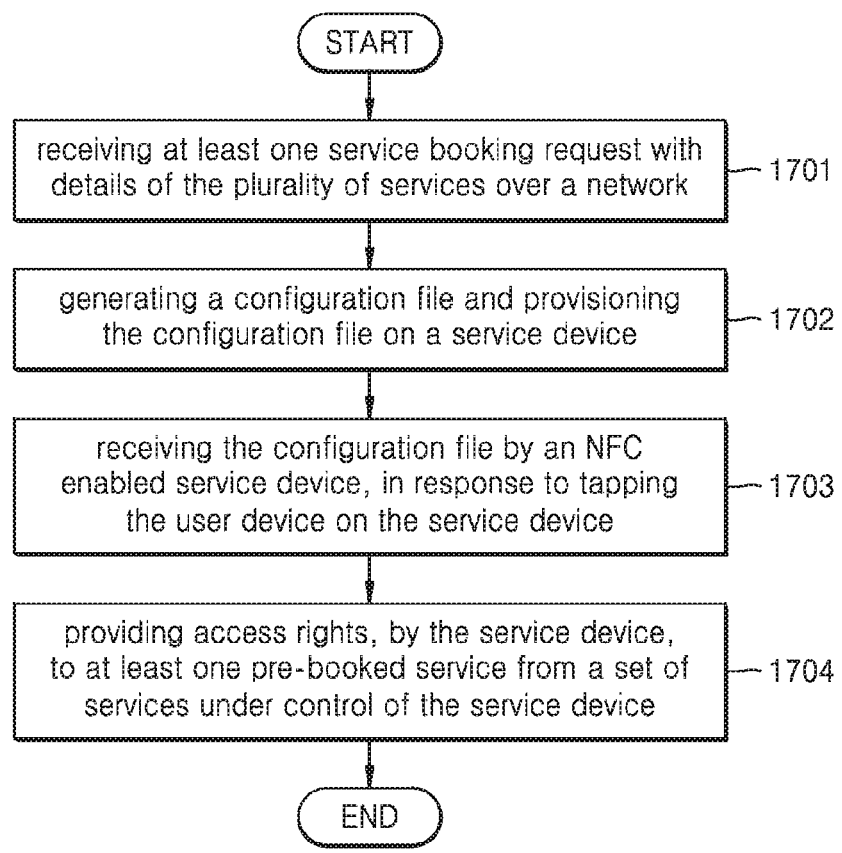
FIG. 17 illustrates a method of providing access to plurality of services under control of at least one service device in accordance with exemplary embodiments.

FIG. 17 illustrates an exemplary method of enabling a service device 10 to provide access to a service corresponding to a reservation request. The method includes receiving, by a file generating apparatus 16 over a network, at least one reservation request for a service (e.g., a request for pre-booking a service) sent by a user via the application 14 at step 1701. Upon receiving the reservation request, the file generating apparatus 16 may generate a configuration file 12 at step 1702 and transmit the configuration file 12 to the application 14 as confirmation of the reservation. The configuration file 12 can be provisioned on a user device 18 such as an NFC enabled mobile device or an NFC tag. The service device 10 receives the configuration file 12 in response to tapping the user device 18 on the service device 10 at step 1703. The service device 10, upon receiving the configuration file 12, may process the configuration file 12 to provide the user device 18 with access to at least one pre-booked service included among a set of services under control of the service device 10 at step 1704.

Figure 18:
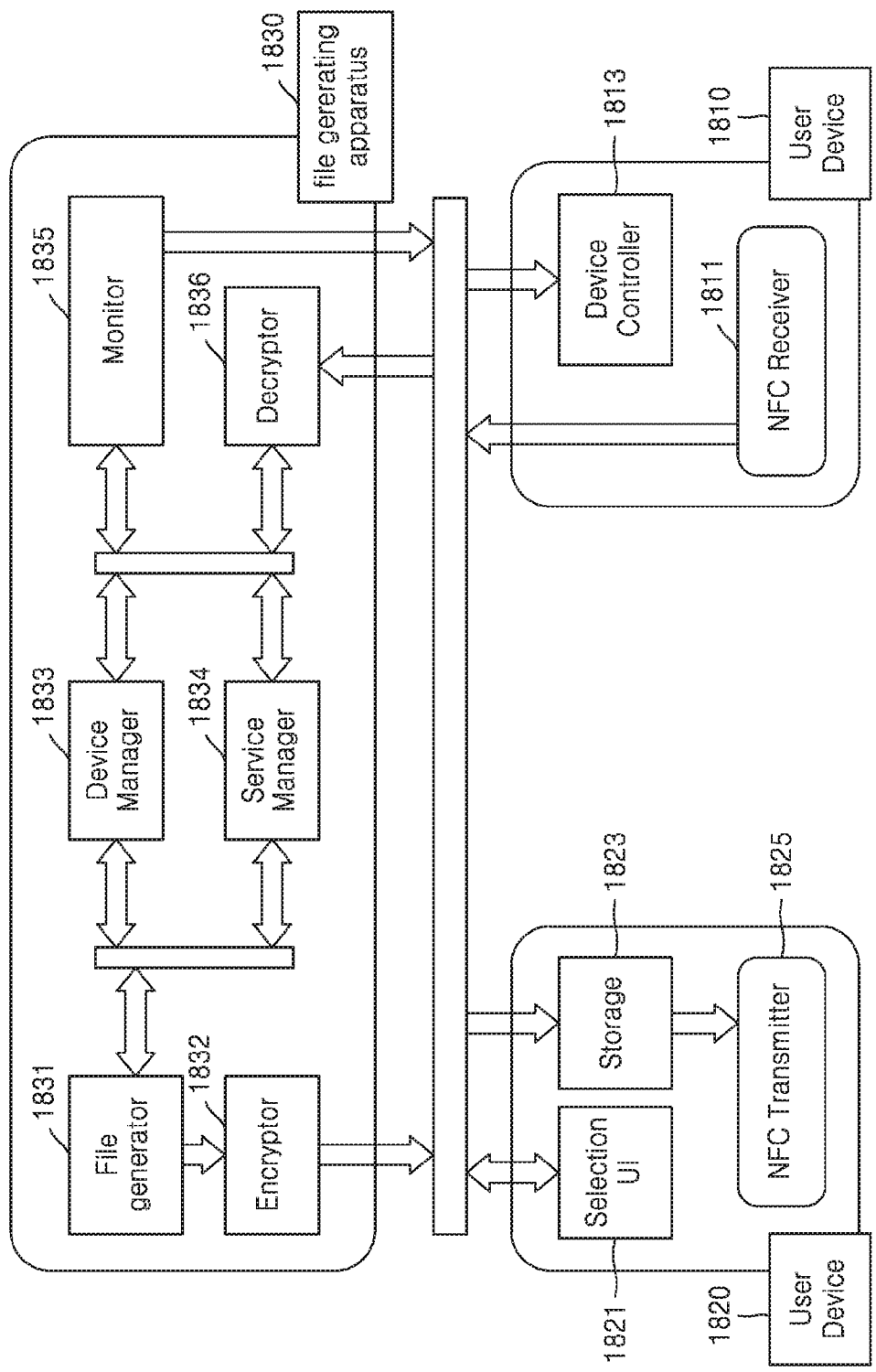
FIG. 18 illustrates a system of and connections between components of the system in accordance with an exemplary embodiment.

FIG. 18 illustrates a system and interconnection between components of the system in accordance with an exemplary embodiment. The system may include a file generating apparatus 1830, a user device 1820 of the user (or NFC tags) and a service device 1810. The NFC receiver 1811 of the service device 1810 receives and converts electromagnetic fields generated from the user device 1820 into voltage levels and thereby into binary values based on an association table. The user device 1820 may interact with the file generating apparatus 1830 over a network. The service device 1810 may interact with the file generating apparatus 1830 over a network.

Figure 19:
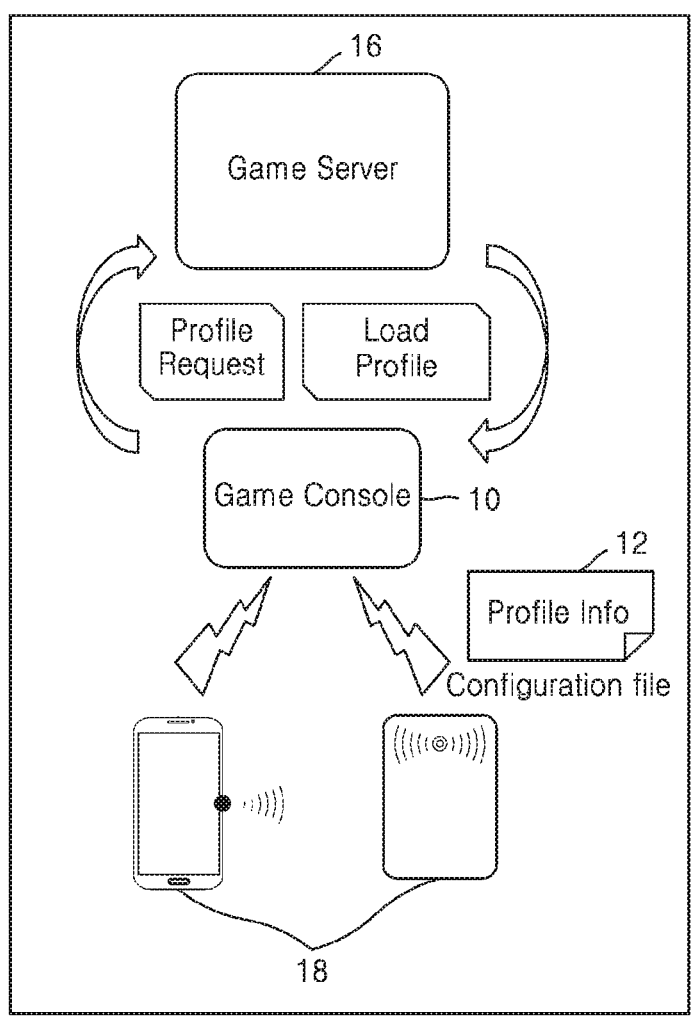
FIG. 19 illustrates the use of a device by multiple users in accordance with an exemplary embodiment.

FIG. 19 illustrates the use of service device 10 by multiple users in accordance with an exemplary embodiment of the present invention. Different users may save different profiles and corresponding configurations to a single service device 10. The service device 10 may be, for example, a game console. To switch between profiles, users have to provide some information. According to an exemplary embodiment, profile information confirming the identity of user and configuration files 12 corresponding to a configuration of the user can be exchanged with single tap of a user device 18, for example, an NFC enabled smart phone or NFC tag, to the service device 10. The service device 10 may thereafter adjust its configuration as per the configuration files 12 received from the user device 18. To access profile-based services, a controller in the service device 10 compares the profile information and the configuration files 12 against profile information and configuration files stored in a database, and upon matching the received profile information and configuration files 12, updates associated components of the service device 10. In the exemplary embodiment of FIG. 19, the service device 10 is a game console accessible by multiple users and which is configured according to user profiles. The service device 10 may adjust or update game content and system configurations, for example, game saves, game content, display settings, windows, applications, and user records, according to the user profile information and configuration files 12 received from the user device 18 and the profile information and configuration files stored in the database. The configuration files 12 may include information such as user information, system configuration details, etc.

Figure 20:
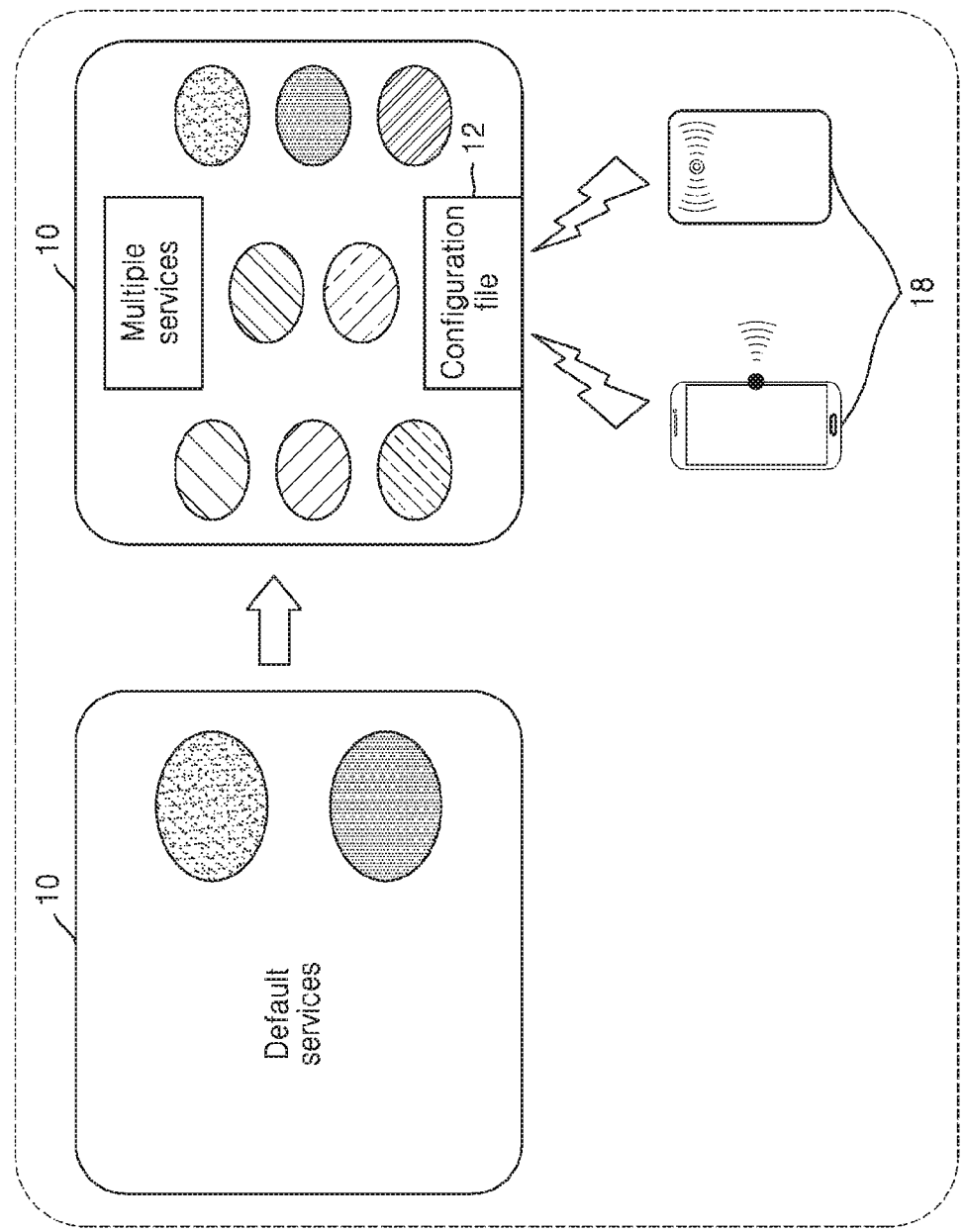
FIG. 20 illustrates conditional access to services in accordance with an exemplary embodiment.

FIG. 20 illustrates conditional access to services in accordance with an exemplary embodiment. When the service device 10 is in an idle state, only default services are available to users. The user device 18 transmits the configuration file 12 to the service device 10 in response to a user tapping the user device 18 on the service device 10. The configuration file 12 is then decrypted and processed to obtain control values for different control functions which control services on the service device 10. As described above, the configuration file 12 may be decrypted/decoded and processed by the service device 10 or with involvement from file generating apparatus (e.g., a backend server). According to an exemplary embodiment, the service device 10 may provide access to pre-booked services to users based on configuration files 12 respectively stored in the NFC devices 18 of each user, thus providing user convenience and security. Once access to the service device 10 expires for a user corresponding to a pre-booked service, the service device 10 may return to the idle state in which only default services are available.

Figure 21:
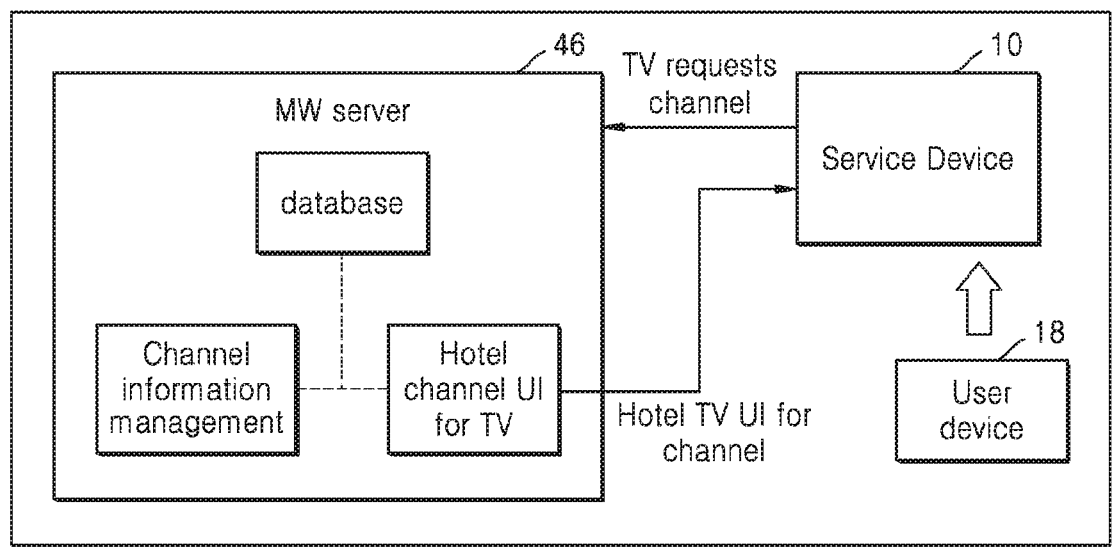
FIG. 21 illustrates access to paid TV channels in accordance with an exemplary embodiment.

FIG. 21 illustrates access to paid TV channels in accordance with an exemplary embodiment. A channel database contains all channels information and parameters associated with the same. Hotel administration may generate customized UI pages showing channel lists and related information using a web application and load the UI pages over a Media Web (MW) server 46. In FIG. 21, the service device 10 may be, for example, a TV. When the service device 10 is in an idle state, only a default channel list is visible to users. The user device 18 transmits the configuration file 12 (not shown in FIG. 21) to the service device 10 in response to a user tapping the user device 18 on the service device 10 (i.e., the TV). The configuration file 12 is then processed to obtain a content list. As described above, the configuration file 12 may be decrypted/decoded and processed by the service device 10 or with involvement from a file generating apparatus 16 (e.g. a backend server). The service device 10 transmits a request to the file generating apparatus 16 to obtain a channel list corresponding to the configuration file 12. The MW server 46 may respond to the request and provide the service device 10 with a channel list displaying paid channels accessible to the user. The configuration file 12 may include information such as user information, usage permissions regarding usage duration, channel access, channel type, decryption keys, etc. Once access to the service device 10 or the pre-booked service expires for the user (e.g., the user checks out of the hotel room), the service device 10 may return to the idle state in which only default services are available.

Figure 22:
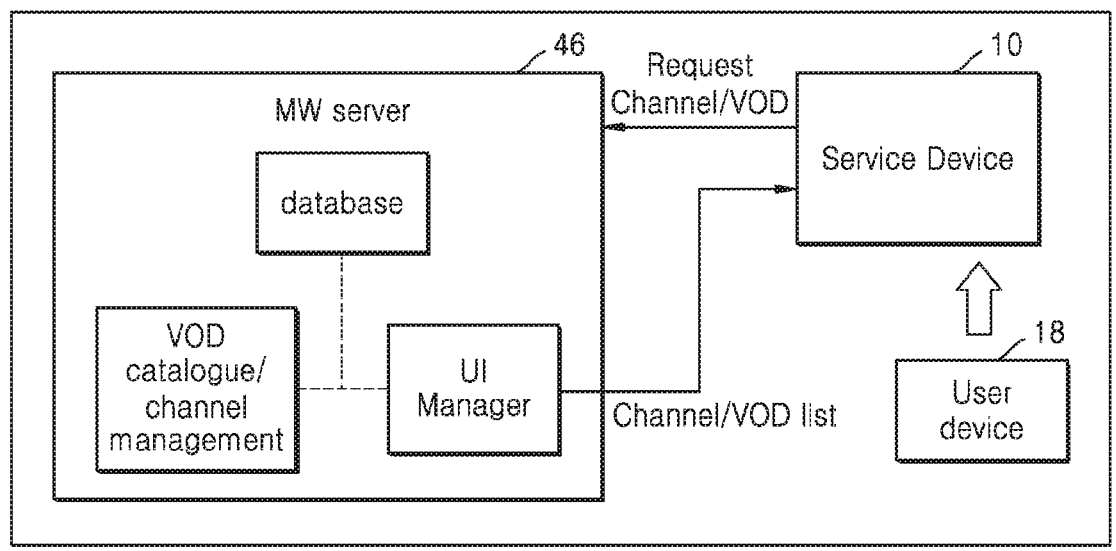
FIG. 22 illustrates access to Video on Demand (VOD) content in accordance with an exemplary embodiment.

FIG. 22 illustrates access to Video on Demand (VOD) content in accordance with an exemplary embodiment. A VOD catalogue having content information such as title, images, duration, genre, etc. is created by hotel administration using a web application and loaded over MW server 46. In creating the VOD catalogue, the MW server 46 obtains data from a database. The catalogue is then formatted to VOD UI frames or pages which can be shown over service devices. Formatting the catalogue into VOD UI frames or pages may also be done by hotel administration over the MW server 46 via a web application. The VOD UI Frames or pages are sent to a service device 10 upon request from the service device 10. The configuration file 12 received by service device 10 (not shown in FIG. 22) is decoded and processed. The service device 10 may transmit a request to MW server 46 for a list of movies or shows accessible by the user of the user device 18. The MW server 46 may respond to the request and provide the service device 10 with a VOD page displaying a list of movies or shows accessible to the user based on the user's pre-booked services. The configuration file 12 may include information such as user information, usage permissions regarding usage duration and VOD accessible to the user, access frequency, payment details, and the like.

Figure 23:
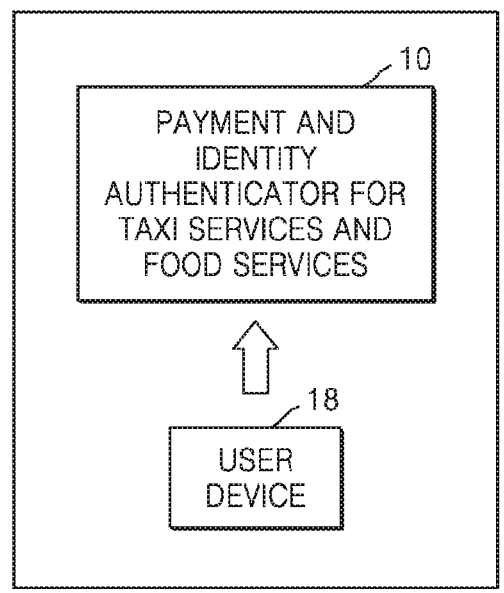
FIG. 23 illustrates access to taxi services and services related to ordering food in accordance with an exemplary embodiment.

FIG. 23 illustrates access to taxi services and services related to ordering food in accordance with an exemplary embodiment. A taxi service can be reserved and paid for in advance. When entering a taxi, a user may tap the user device 18 to a service device 10 belonging to the taxi driver or installed in the taxi, and the service device 10 may authenticate payment & user identity. Food ordered and paid for in advance by a user, can be requested at the counter of a restaurant or business with a single tap of the user device 18 to a service device 10 located at the counter. A configuration file 12 including details of the food order is received by the service device 10, which may then transmit the configuration file 12 to a counter manager in a server from where the request is processed. The configuration file 12 may include information such as user information, payment details, scheduled pickup time, item type, etc.

Figure 24:
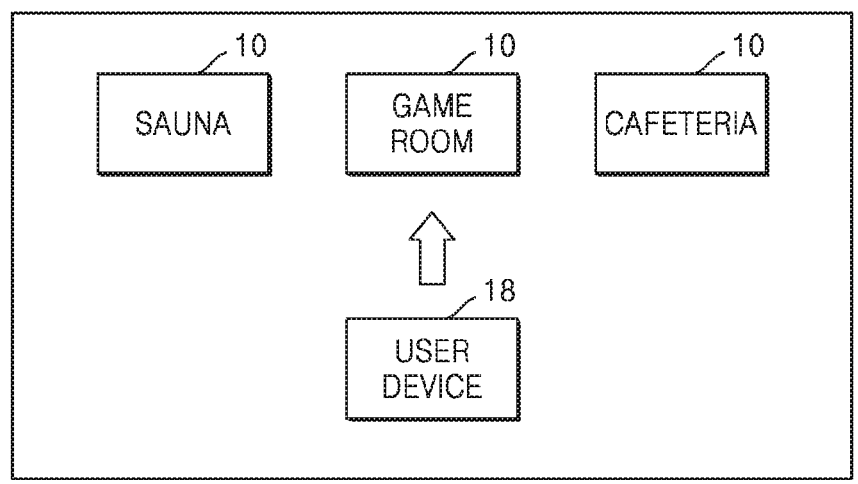
FIG. 24 illustrates access to various amenities offered by a hotel in accordance with an exemplary embodiment.

FIG. 24 illustrates access to various amenities offered by a hotel in accordance with an exemplary embodiment. Access to amenities such as a spa, sauna, game room, swimming pool, cafeteria, etc. is limited to customers who have opted for the same. Access to the amenities may be managed using configuration files 12 sent to user devices 18 upon making a reservation for a room or services. To access amenities or services corresponding to a reservation, a user may tap user device 18 to a service device 10 controlling access to a desired amenity or service (e.g., a service device 10 which unlocks the door to a sauna, a service device 10 which controls access to a locker, a service device 10 installed on a vending machine), and the service device 10 may authenticate the user based on the configuration file 12 stored in the user device 18. The configuration file 12 may include information such as an access key, user information, access duration, access frequency, service type, etc.

Figure 25:
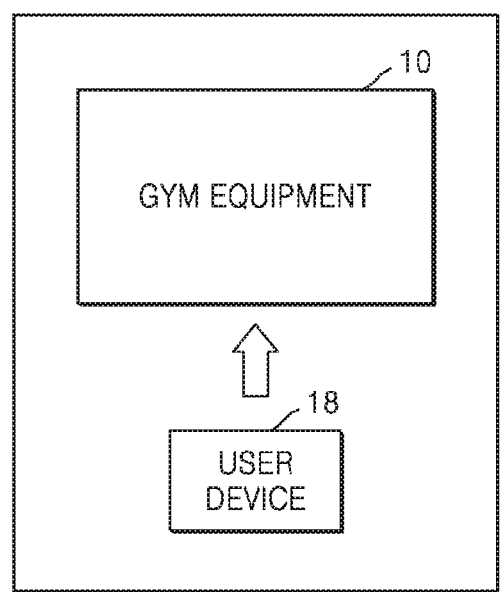
FIG. 25 illustrates access to gym equipment in accordance with an exemplary embodiment.

FIG. 25 illustrates access to gym equipment 10 which keep track of daily workouts, in accordance with an exemplary embodiment. A configuration file 12 may be used to obtain data corresponding to a user from a server or cloud server. The data may include daily workout goals, exercise times, etc. which have been chosen and saved by the user when making a reservation. During or after a workout, a user may tap user device 18 to an service device 10 installed on or next to gym equipment used by the user, and the service device 10 may transmit data corresponding to the user's profile, for example, burned calories, to a server. The data may be used for tracking weekly or monthly statistics. The configuration file 12 stored in the user device 18 may include information such as user information, type of items, parameter associated with each item etc.

Users may also redeem reward points in accordance with an exemplary embodiment. A service provider gives reward points based on services purchased and amount paid. These reward points can be redeemed using a configuration file 12 stored in the user device 18. When making a purchase or redeeming reward points, a user may tap user device 18 to a service device 10 located, for example, at a service counter or checkout register, and a configuration file 12 is sent from the user device 18 to the service device 10. The service device 10 may authenticate the user and allow the user to redeem points during a transaction. The configuration file may include information such as user information, reward points, payment details, rewards type, etc.

The user may also be provided with a new configuration file or an updated configuration file if he changes his room during his visit at a hotel. Moreover, the user may also be refunded for any services which were unused during the user's visit. The refund may be provided in the form of payment or points applied to the user's account. Also, hotel administrators may be provided with applications to manage or control the services at their end.

While certain present example embodiments of the invention have been illustrated and described herein, it is to be understood that the invention is not limited thereto. Clearly, various embodiments of the invention may be otherwise implemented and practiced within the scope of the following claims.

I claim:

1. A method of accessing at least one service, the method comprising:
    transmitting, from a first device of a user to a second device, a reservation request for at least one service, wherein the reservation request includes identification of the at least one service to be provided and a service device providing the at least one service, the service device being different from the first device of the user;
    in response to the reservation request for the at least one service, receiving, by tapping the first device and via near field communication with the second device, a configuration file decoded by the second device based on the identification of the at least one service and the service device identified in the reservation request by the second device;
    transmitting, to the service device which is different from the first device of the user, the decoded configuration file, wherein the service device transmits the decoded configuration file to the second device and receives control information that is generated by the second device based on the decoded configuration file; and
    obtaining access to the at least one service corresponding to the reservation request based on the control information.

2. The method of claim 1, wherein a format of the control information is at least one of xml, j son, csv, dat, PHP serialized, or PHP associative.

3. The method of claim 1, wherein the reservation request is at least one of reserving a hotel room, reserving a taxi, reserving a conference room, selection of digital content, reserving a game room or game console, making a spa appointment, ordering food, making travel reservations, or reserving a hospitality suite.

4. The method of claim 1, wherein the configuration file comprises at least one of reservation details, reservation time, user information, device information corresponding to one or more devices, list of content, service type, access frequency of the at least one service, number of services, payment information, or transaction information.

5. The method of claim 1, wherein the reservation request is made by the user via a mobile application or a web application.

6. The method of claim 1, wherein the at least one service includes access to a plurality of content available via a content renderer, the plurality of content including at least one of audio content, video content, multimedia content, or gaming content.

7. The method of claim 1, wherein the configuration file is an encoded file.

8. The method of claim 1, wherein the second device is a mobile device or a tag.

9. The method of claim 1, wherein the configuration file is a confirmation of the reservation request.

10. The method of claim 1, further comprising:
    selecting one of the at least one service via a user interface, wherein the user interface is rendered by a content renderer.

11. The method of claim 10, further comprising analyzing, by an analyzer, the user's selecting one of the at least one service.

12. An apparatus for accessing at least one service, the apparatus comprising:
    a transmitter configured to transmit, to a second device, a reservation request for at least one service, wherein the reservation request includes identification of the at least one service to be provided and a service device providing the at least one service;
    a receiver configured to, in response to the reservation request for the at least one service, receive, by tapping the apparatus and via near field communication with the second device, a configuration file decoded by the second device based on the identification of the at least one service and the service device identified in the reservation request by the second device; and
    a processor configured to obtain access to the at least one service corresponding to the reservation request based on control information,
    wherein the transmitter is further configured to transmit, to the service device which is different from the apparatus, the decoded configuration file, wherein the service device transmits the decoded configuration file to the second device and receives the control information that is generated by the second device based on the decoded configuration file, and
    wherein the transmitter, the receiver and the processor are implemented as at least one hardware processor.

13. The apparatus of claim 12, wherein the receiver is further configured to receive the control information that is generated at the second device based on the decoded configuration file.

14. The apparatus of claim 12, wherein the at least one hardware processor provides a user interface via which a user selects one of the at least one service.

15. The apparatus of claim 14, wherein the at least one hardware processor analyzes the user's selecting the one of the at least one service.

\* \* \* \* \*